United States Patent [19]

German

[11] 3,710,875
[45] Jan. 16, 1973

[54] DOWN PRESSURE ASSEMBLY FOR TRUCK MOUNTED AUGER

[75] Inventor: Louis E. German, Princeville, Ill.

[73] Assignee: Morton Buildings, Inc., Morton, Ill.

[22] Filed: Feb. 18, 1971

[21] Appl. No.: 116,517

[52] U.S. Cl. .................. 173/28, 172/464, 173/26
[51] Int. Cl. .............................................. E21c 11/02
[58] Field of Search............ 173/26, 28, 38, 140, 160; 172/464

[56] References Cited

UNITED STATES PATENTS

| | | |
|---|---|---|
| 2,931,446 | 4/1960 | Gwinn................................172/464 |
| 3,527,308 | 9/1970 | Bernotas et al.......................172/464 |
| 3,022,839 | 2/1962 | Troche...............................173/28 X |
| 3,132,705 | 5/1964 | McGee...............................173/26 X |

*Primary Examiner*—Ernest R. Purser
*Attorney*—Hill, Sherman, Meroni, Gross & Simpson

[57] ABSTRACT

A down pressure assembly for use in combination with a boom pivoted adjacent one end to a truck or similar vehicle and carrying on its free end a depending auger. The assembly includes a frame carrying means to apply additional downward pressure to the boom to force the auger to bore through frozen ground or some other equally hard substance to insure positive action of the auger.

5 Claims, 5 Drawing Figures

PATENTED JAN 16 1973

INVENTOR.
LOUIS E. GERMAN

ATTORNEYS

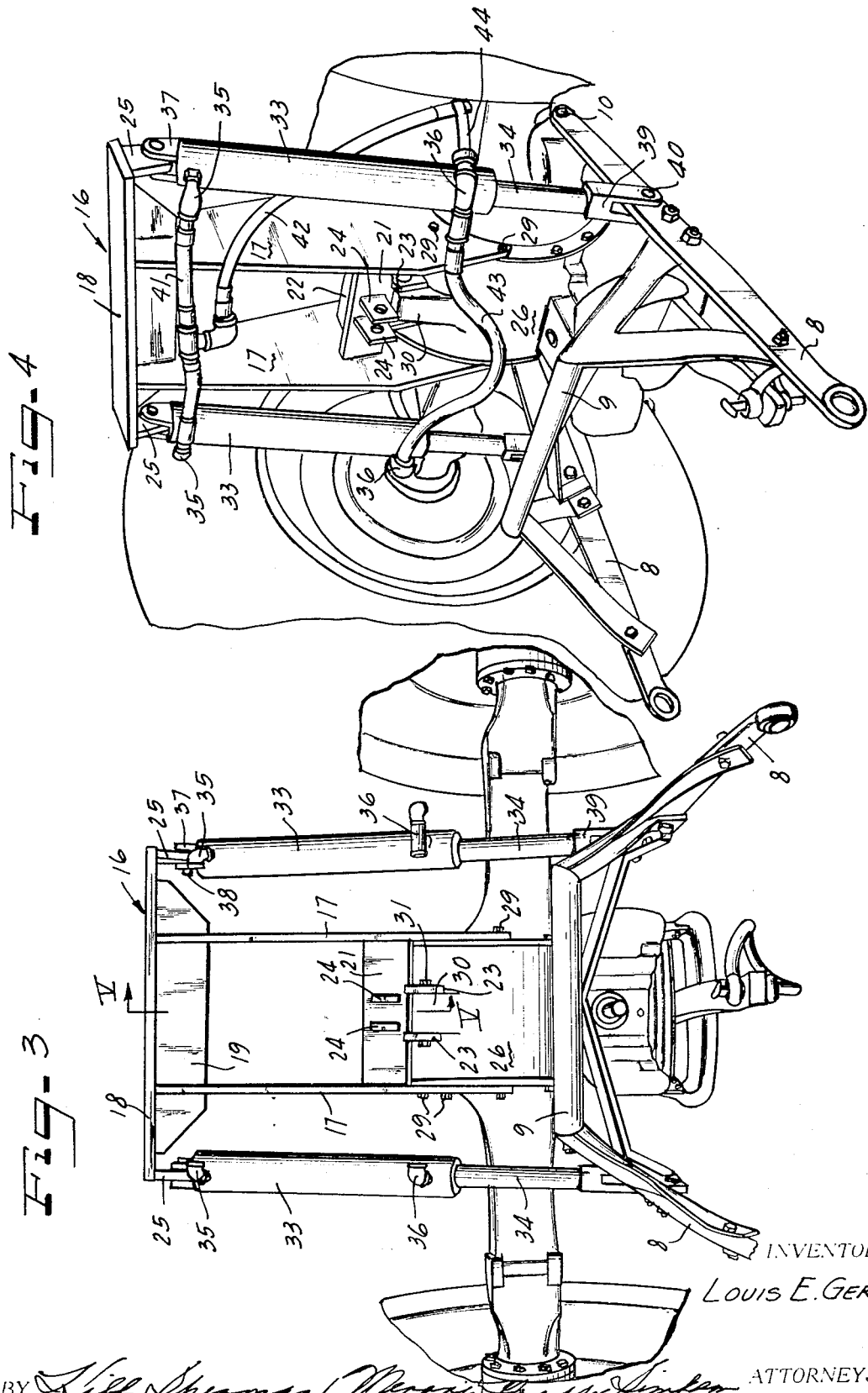

DOWN PRESSURE ASSEMBLY FOR TRUCK MOUNTED AUGER

SUMMARY OF THE INVENTION

Heretofore, a vehicle having a power take-off has been equipped with a boom pivoted adjacent one end thereof to the vehicle and having an auger depending from the outer free end of the boom. However, it has been found that the weight of the boom is not sufficient to force the auger to bore into frozen ground or some similarly hard substance, but the auger would merely rotate on the surface and not advance into the ground or other substance. By way of example, holes for building supporting posts could not satisfactorily be bored into the ground in cold weather, especially when the ground was frozen to a depth of several feet.

The instant invention overcomes the foregoing disadvantage with structures heretofore used, by the provision of means for applying additional down pressure on the boom to force the auger to bore into frozen ground or other hard substance. The pressure means are such that they also function to lower or raise the boom and maintain the boom in a raised position, eliminating boom raising and lowering means heretofore employed. More specifically, when the invention is associated with a lift truck or tractor, an upstanding frame is fixedly secured to a portion of the truck. One end of the boom is pivoted to such frame, and the frame carries pressure applying means, which may be in the form of one or more hydraulic jacks, which act upon the lift arms pivoted to a part of the truck. The pressure applying means are reversible so that they may either raise or lower the lift arms which are provided with means to support the boom, and consequently raise or lower the boom. When the boom and its auger are in operating position, the pressure means controlled from the truck act to exert down pressure on the lift arms in excess of the weight of the boom to thus force the auger to do its work. The instant invention is highly durable, simple in construction, and economical to manufacture and use.

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure.

BRIEF DESCRIPTION OF THE SEVERAL VIEWS OF THE DRAWINGS

FIG. 3 is a fragmentary enlarged showing of the instant invention mounted in position between the rear wheels of the truck, with the boom removed for purposes of clarity;

FIG. 4 is an isometric view of the rear end of the truck, with the boom removed, but also illustrating the connections to the opposed hydraulic jacks.

DETAILED DESCRIPTION

Figure 1:
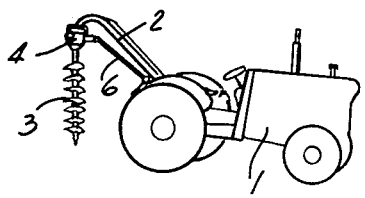
FIG. 1 is a fragmentary side view of a lift truck carrying a boom with a dependent auger, and equipped with the instant invention.
Figure 2:
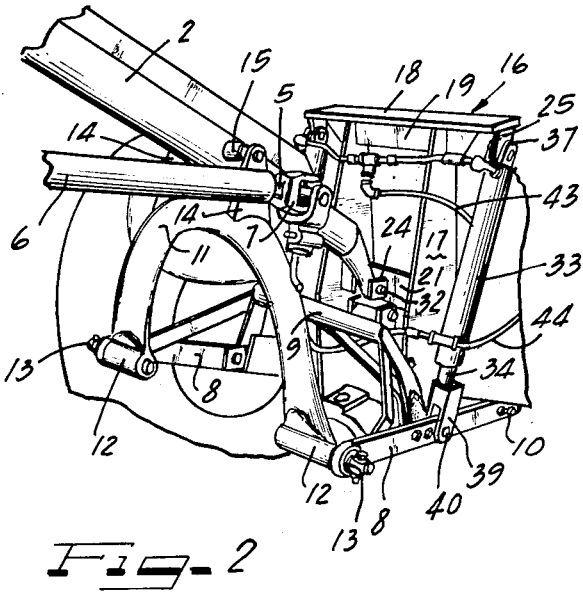
FIG. 2 is a fragmentary isometric view of the structure around the inner end of the boom illustrating the instant invention holding and controlling the boom.

In FIG. 1 there is a somewhat diagrammatic showing of a lift truck 1 from the rear end of which a boom 2 extends, with an auger 3 suspended from the outer end of the boom. Also, as seen in FIGS. 1 and 2, there is a gear box 4 between the outer end of the boom and the auger 3 from which the auger is rotated by means of a shaft 5 housed within a sleeve 6, the shaft extending from the gear box to a universal joint 7 connected in any suitable manner to the power take-off of the truck 1.

The truck is provided with a pair of opposed lift arms 8—8 extending rearwardly from the truck frame and connected together by a rigid overhead frame 9 to cause the lift arms to act in unison. Each of the lift arms is pivoted at its inner end, as indicated at 10, to any suitable portion of the truck chassis. The outer ends of the lift arms 8—8 are connected by an upwardly bowed boom supporting yoke 11, FIG. 2, which has its lower ends expanded to form bearing holders 12—12 for the pivotal reception of stub shafts 13—13 passing through the ends of the lift arms 8—8. At the top thereof, the yoke is provided with upstanding lugs 14—14 welded to the yoke, and the boom 2 is pinned to those lugs by a cross-pin 15.

Figure 5:
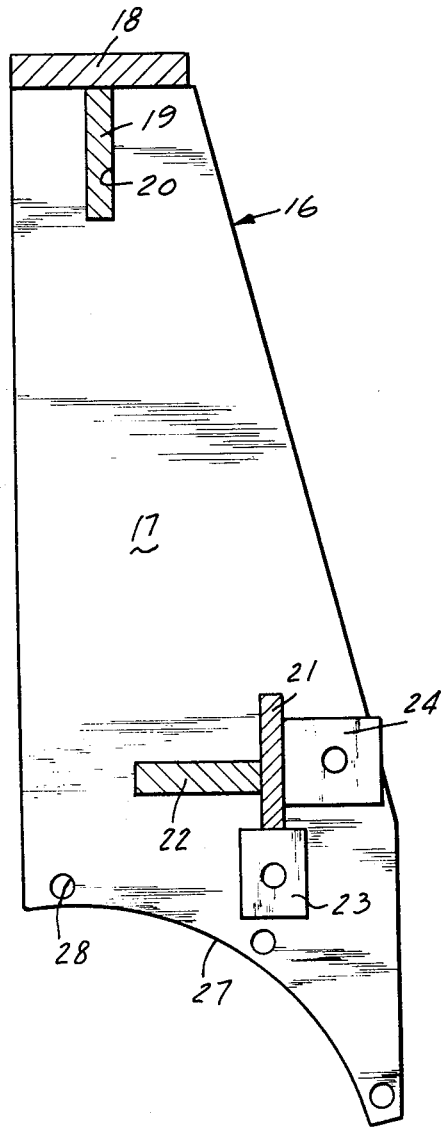
FIG. 5 is an enlarged vertical sectional view of the jack frame only.

An important feature of the instant invention is an upstanding fabricated T-frame, generally indicated by numeral 16. All parts of this frame itself are welded or equivalently secured together to provide a rigid and strong frame. This frame, as best seen in FIGS. 3 and 5, comprises a pair of like side members 17—17 on the top of which is disposed a lateral flat member 18 extending at each end beyond the respective side members. To the bottom of the member 18 a verically disposed reinforcing member 19 is secured, this member also extending laterally beyond each side member, but terminating short of the ends of the top member 18, as seen in FIG. 3. Each side member is provided with a notch 20 at the upper end thereof to receive the reinforcing member 19 and be secured thereto. Near the lower portion thereof, the frame is provided with a laterally extending and vertically disposed cross member 21 between the two side members 17—17, and behind that cross member 21 is a horizontally disposed member 22 also extending between the side members and secured both thereto and to the cross member 21 so that there is a cross reinforcement at this point in the general shape of a lazy-T. Secured to the bottom edge of the transverse member 21 is a pair of spaced apertured lugs 23—23, and secured to the outside face of the member 21 is another pair of spaced apertured lugs 24—24. As seen best in FIGS. 3 and 4, an apertured lug 25 depends from each end of the top member 18. From the showing in FIG. 5, it will be noted that the side members 17—17 are wider at the bottom than at the top to best insure solid securement to a portion of the vehicle or truck 1.

While the frame may be attached to the vehicle in various places, the preferred location is to attach the lower portion of the frame to the differential housing 26 between the rear wheels of the truck. To that end, the lower end of each side member 17 is formed in an arc 27, FIG. 5, and provided with a series of apertures 28 to accommodate bolts 29 by means of which the side members 17—17 are connected to the differential housing. As seen in FIG. 3, when the frame is so positioned, the lugs 23—23 on the frame project over a boss 30 or the equivalent carried by the differential housing, and these lugs are bolted to the element 30 as indicated at 31 to insure positive stability of the frame when attached. When the frame is so mounted, the inner end of the boom 2 is pivotally connected between the lugs 24—24 of the frame, as indicated at 32 in FIG. 2.

Means for both lifting or raising the boom and for exerting additional down pressure to a desired extent upon the boom when it is lowered, and in the illustrated instance two such means are shown, although the number is not critical but depends in general upon the amount of pressure desired when the boom is in operating position. Also, in the illustrated embodiment, the lifting and down pressure means are shown in the form of a known type of double-acting or reversible hydraulic jack comprising a cylinder 33 having a piston therein and with the piston rod 34 extending outside the cylinder. The piston may be forcibly moved in either direction, since it has a port 35 at one end and another port 36 at the other end for the entrance or exit of hydraulic fluid. One such jack depends from each lug 25 attached to the upper frame member 18. Both said jacks are identical in construction, operation, and mounting. Each cylinder 33 has a clevis 37 at the top embracing the respective depending lug 25, and is pivotally connected thereto by way of a pivot pin 38. Similarly, the outer end of the piston rod 34 carries a clevis 39 pivoted as at 40 to substantially the midway position of the respective lift arm 8.

As seen best in FIG. 4, the ports 35—35 at the upper end of the cylinders 33—33 are connected together by a cross line 41, and the center of the line 41 is connected to a master line 42 to suitable hydraulic power and control mechanism, not shown, but which is carried by the truck in a position available to the driver. Likewise, the bottom ports 36—36 are connected by a cross connection 43 and another master line 44 leads back to the power and control mechanism on the truck. With such arrangement, the jack pistons are operated in unison, under the same degree of pressure, and the same length of stroke. When downward pressure is applied by the jacks to the lift arms 8—8 and consequently to the boom 2, the top member 18 of the frame 16 acts as a backup for the pressure in the cylinders 33—33.

In operation, the instant invention is extremely simple and positive. By admitting hydraulic fluid into the upper ports of the cylinders 33—33 and permitting fluid to exit out the lower ports, the boom may be lowered from traveling position to operative position to lower the auger as accurately and as gently as desired. Then with the auger spinning, considerable added pressure may be placed downwardly on the boom by the hydraulic jacks to the extent desired and a post hole can be bored into deeply frozen ground or some other substance of equal hardness, in a very short length of time. Boring such a hole requires only a relatively short stroke of the pistons in the jacks, if the parts are properly proportioned. By way of example, the structure shown in FIG. 1 can be used for boring a hole approximately 5 feet deep and approximately 14 inches in diameter with a piston stroke of less than fourteen inches. Not only does the frame provide a pivot point for the boom, but the frame also carries the hydraulic jacks and is constructed to effectively resist back pressure from the jacks when applying down pressure on the boom to a considerable extent. The frame is exceedingly strong and durable and easily mounted in position on the truck.

I claim as my invention:

1. Mounting means for connecting a boom carrying an auger to a motor vehicle having a pair of lift arms pivoted thereto and connected together to act in unison, said mounting means comprising
    an upstanding unitary frame secured adjacent its lower end to a part of the vehicle, and including
    a pair of spaced side members,
    a lateral member secured to the top of said side members with its end portions projecting beyond the respective side members,
    a cross member secured to and disposed between said side members at a lower portion thereof,
    lugs extending from the face of said cross member and between which one end of the boom is pivoted,
    boom supporting means pivoted at each end to the outer end of a lift bar, and
    a double-acting hydraulic jack assembly pivotally connected at one end to and depending from each end of said lateral member outside of the respective side member, the opposite ends of said assemblies being pivotally connected one each to said lift arms to actuate the boom and exert pressure thereon to add a downward force on the auger while boring.

2. A structure as set forth in claim 1, including
    hydraulic lines interconnecting the cylinders of said jack assemblies to insure the assemblies operating in unison under the same pressure and with the same length of stroke in either direction.

3. A structure as set forth in claim 1, including
    a cross member secured to said lateral member at a right angle thereto, and
    a cross member secured at a right angle to the first said cross member,
    whereby a stronger frame is provided.

4. A structure as set forth in claim 1, wherein the frame side members are shaped at the lower ends thereof in accord with the curvature of the differential housing of the vehicle, and the frame straddles the differential housing and is secured thereto.

5. The structure of claim 4, wherein the vehicle differential housing has a centrally located upstanding boss thereon, and including lug means depending from said cross member for connection to said boss to rigidify and further stabilize said frame.

* * * * *